A. C. BROWNLICH.
Harvester.
No. 22,483.  Patented Jan'y 4, 1859.
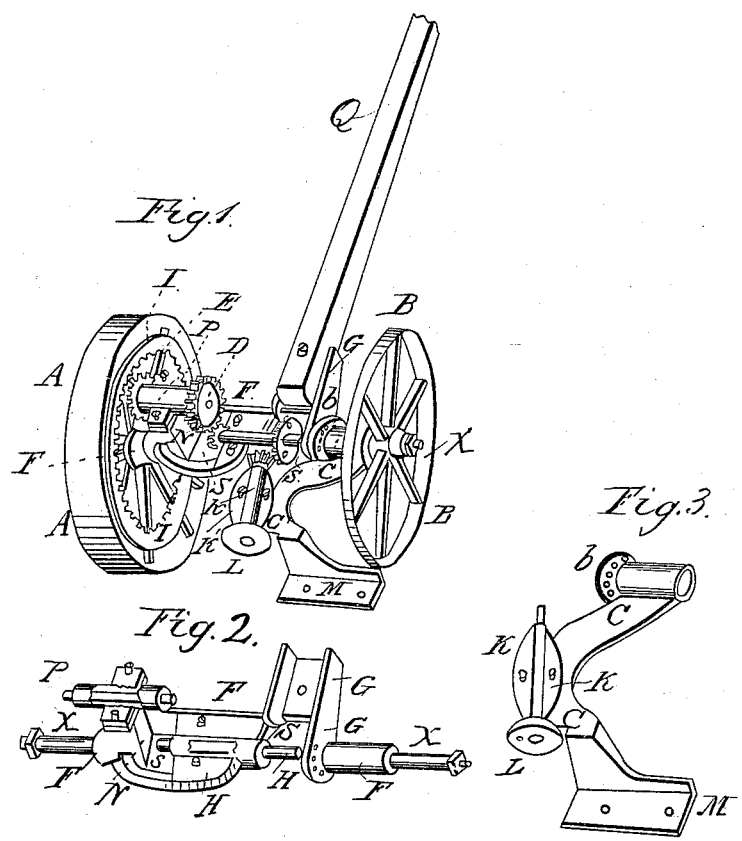

UNITED STATES PATENT OFFICE.

A. C. BROWNLICH, OF BUFFALO, NEW YORK.

IMPROVEMENT IN HARVESTERS.

Specification forming part of Letters Patent No. 22,483, dated January 4, 1859.

*To all whom it may concern:*

Be it known that I, A. C. BROWNLICH, of the city of Buffalo, county of Erie, State of New York, have invented new and useful Improvements in Harvesters; and I do hereby declare that the following is a full and exact description thereof, reference being had to the accompanying drawings, and to the letters of reference marked thereon, making a part of this specification, like letters referring to like parts in all the figures.

The nature of my invention consists in so constructing the axle of a harvesting-machine as to form thereof, in connection with its adjuncts, the frame to which to attach the gearing, all substantially in the manner and for the purposes hereinafter described.

To enable others skilled in the art to make and use my improvements, I will proceed to describe the construction and operation.

Figure 1 of the drawings represents the whole machine; Fig. 2, the axle F, with its attachments, center shaft, H H, pillow-block N, cast to the axle F F, the multiplying-shaft P P, the pole-section G G, cast with the axle F F, and the spaces S S, to be occupied by the multiplying bevel-pinion $o$ $o$ and small pinion $t$. Fig. 3 represents the movable arm C C, with the flange $b$ cast upon the same, the crank-shaft K K, and box bolted thereto.

I take the master or driving wheel A A and place it upon the bearing X of the axle F F, at the left, and the support-wheel B B upon the bearing X of the axle, at the right end of the same, as seen in Figs. 1 and 2. The arm $c$ $c'$ is located upon the axle at the right, occupying the space between the bearing X and pole-section G G, with the crank-shaft attached, as seen in Fig. 1. The center shaft, H H, is located at the center and in line with the axle F F, as seen in Fig. 2, without the pinion, and in Fig. 1 with the multiplying-pinion $o$ $o$ upon the right end of center shaft, H H, the pinion $o$ $o$ occupying the space S, and the small pinion $t$ the left end of the shaft, and occupying the space provided at that end of the shaft within the axle F F. The elevated shaft P P, as seen in Fig. 2, is located upon the pillow-block N and in a line parallel with the center shaft, H H, and axle F F, as also seen in Fig. 1, with the multiplying-pinion D D upon the right end of the shaft P P, and the small pinion E E upon the left, meshing into the master-wheel gear I I, and the multiplying-pinion D D is connected to the small pinion $t$ of center shaft, H H, and the multiplying bevel-pinion $o$ $o$ is connected to the small bevel-pinion $v$ of crank-shaft K K, the same being upon a line with the pole Q Q. The circular plate L is placed upon the lower end of the crank-shaft K K. The arm $c$ $c$ is so bent at the base as to form a heavy fang, M.

Operation: As the master-wheel A A revolves in connection with the large gear I I, and thus moving the elevated shaft P P, stationed upon the pillow-block N, and the multiplying-pinion D D being connected to the small pinion $t$, moves the center shaft, H H, and the crank-shaft K K is moved by the connection of the small pinion $v$, meshing into the multiplying-pinion $o$ $o$ of center shaft, H H. The pole Q Q may be elevated or depressed, as well as the movable arm C C, independent of each other, upon the axle F F. The small bevel-pinion $v$ of crank-shaft K K moves upon the circle indicated by the bevel-pinion $o$ $o$, the center of which being the center shaft, H H. The arm C C may be retained at any point of its movement by inserting a bolt through the orifices of the flange L of the arm C C and the pole-section G G, and the two pinions $v$ and $o$ $o$ remain in connection with each other and operate harmoniously, as seen in Fig. 1.

Having thus fully described my improvement in harvesters, what I claim, and desire to secure by Letters Patent, is—

The axle F, in combination with the pinions $o$ $t$ $v$ D, shaft H, and pillow-block N, constructed, arranged, and operating substantially in the manner described, for the purpose specified.

A. C. BROWNLICH.

Witnesses:
 D. D. BIDWELL,
 JOHN A. SCHMITT.